(12) United States Patent
Koch et al.

(10) Patent No.: US 9,103,166 B2
(45) Date of Patent: Aug. 11, 2015

(54) ROD ASSEMBLY AND DEVICE FOR TRENCHLESS REHABILITATION OF PIPELINES

(75) Inventors: Elmar Koch, Eslohe (DE); Sebastian Fischer, Lennestadt (DE)

(73) Assignee: TRACTO-TECHNIK GMBH & CO. KG, Lennestadt (DE)

( * ) Notice: Subject to any disclaimer, the term of this patent is extended or adjusted under 35 U.S.C. 154(b) by 71 days.

(21) Appl. No.: 13/461,207

(22) Filed: May 1, 2012

(65) Prior Publication Data

US 2012/0282033 A1 Nov. 8, 2012

(30) Foreign Application Priority Data

May 2, 2011 (DE) .......................... 10 2011 100 186

(51) Int. Cl.
| | | |
|---|---|---|
| E21B 17/04 | (2006.01) | |
| E21B 7/20 | (2006.01) | |
| E21B 17/046 | (2006.01) | |
| F16B 7/00 | (2006.01) | |
| E06B 3/98 | (2006.01) | |
| F16L 55/18 | (2006.01) | |

(52) U.S. Cl.
CPC . *E21B 7/205* (2013.01); *E06B 3/98* (2013.01); *E21B 17/04* (2013.01); *E21B 17/046* (2013.01); *F16B 7/00* (2013.01); *F16L 55/18* (2013.01)

(58) Field of Classification Search
USPC ........ 405/184, 184.1; 403/311, 354, 364, 380
See application file for complete search history.

(56) References Cited

U.S. PATENT DOCUMENTS

| 709,762 | A | * | 9/1902 | Greaves ........................ 403/353 |
|---|---|---|---|---|
| 721,427 | A | * | 2/1903 | Cope ............................ 403/353 |
| 730,186 | A | * | 6/1903 | Case ............................. 403/353 |
| 5,188,539 | A | * | 2/1993 | Langdon ....................... 439/341 |
| 5,980,157 | A |  | 11/1999 | Püttman |
| 2006/0156879 | A1 | * | 7/2006 | Koch et al. ....................... 83/13 |
| 2007/0284149 | A1 | * | 12/2007 | Koch et al. ................... 175/267 |
| 2009/0220305 | A1 | * | 9/2009 | Koch et al. ................. 405/184.1 |
| 2010/0196089 | A1 | * | 8/2010 | Puttmann ..................... 403/294 |
| 2011/0209920 | A1 | * | 9/2011 | Puttmann ..................... 175/320 |

FOREIGN PATENT DOCUMENTS

| DE | 196 08 980 A1 | 9/1997 |
|---|---|---|
| DE | 10 2007 016 822 A1 | 10/2008 |
| WO | WO 2008122423 A2 * | 10/2008 |

* cited by examiner

*Primary Examiner* — Benjamin Fiorello
*Assistant Examiner* — Kyle Armstrong
(74) *Attorney, Agent, or Firm* — Howard IP Law Group, PC

(57) ABSTRACT

A rod assembly for a device for trenchless rehabilitation of pipelines includes at least two rod sections connectable to one another by a plug connection in a tension-proof manner, with at least a first one of the rod sections having an end formed with a lateral opening, and a second one of the rod sections having an end formed with a crosspiece for insertion in the lateral opening of the first rod section. Those end faces of the lateral opening and the crosspiece which are pressed against one another in response to a tensile load of the rod assembly have an arched configuration.

21 Claims, 5 Drawing Sheets

ROD ASSEMBLY AND DEVICE FOR TRENCHLESS REHABILITATION OF PIPELINES

CROSS-REFERENCES TO RELATED APPLICATIONS

This application claims the priority of German Patent Application, Ser. No. 10 2011 100 186.0, filed May 2, 2011, pursuant to 35 U.S.C. 119(a)-(d), the content of which is incorporated herein by reference in its entirety as if fully set forth herein.

BACKGROUND OF THE INVENTION

The present invention relates to a rod assembly and device for trenchless rehabilitation of pipelines.

The following discussion of related art is provided to assist the reader in understanding the advantages of the invention, and is not to be construed as an admission that this related art is prior art to this invention.

Trenchless rehabilitation of pipelines involves the use of devices in which a new pipe is drawn into an old pipe laid underground previously. The old pipe can either be completely replaced and destroyed in the soil, with the generated fragments displaced radially in the soil, or the old pipe can be pushed out of the soil. The destruction of the old pipe is realized by an upsizing head having an outer diameter which is greater than the inner diameter of the old pipe. The upsizing head is pulled through the old pipe so as to burst the old pipe from within and to displace the fragments into the surrounding soil. The new pipe can be directly attached to the upsizing head so that the destruction of the old pipe is accompanied with an installation of the new pipe. Pushing out the old pipe involves the use of an adapter which is attached to the trailing end of the old pipe. As the old pipe steadily exits the borehole, portions thereof are periodically cut away and disposed of, while a new pipe is pulled in at the same time by attaching it to the adapter.

In the event, there is no intent to fully replace the old pipe but the inside of the old pipe should rather be rehabilitated by applying a lining, a new pipe, configured as a so-called "liner", is periodically drawn into the old pipe. The liner involves a tube or hose of a wall thickness which is less than the wall thickness of a new pipe.

A pulling device is used to draw in the new pipe for trenchless rehabilitation of pipelines and is normally arranged in a pit adjacent to the portion of the old pipe to be rehabilitated. The pulling device is connected by a traction member with the upsizing head or adapter to which the new pipe is attached. Cable winches have been used as pulling devices because of their reasonable costs, however only fairly small pulling forces can be generated. Therefore, the use of cable winches has been limited to a trenchless replacement of pipelines of small diameter or applying a liner for lining pipelines of average diameter. In many cases, the use of hydraulic linear pulling devices has been proposed which have a drive element that can be connected temporarily with the pulling element and is moved back and forth by one or more hydraulic cylinders cyclically in a direction of the pipe length axis so as to incrementally pull in the new pipe into the soil.

These linear pulling devices are normally combined with a traction member in the form of a rod assembly which has a plurality of interconnected rod sections. Rod assemblies are easy to handle because of the subdivision into individual rod sections that allows the length of the rod assembly to be extended or shortened to suit the work progress at hand by adding or detaching individual rod sections.

The individual rod sections of a rod assembly are normally connected to one another via thread connections which are widely available as they can be produced easily and inexpensively. However, connecting the rod sections to one another becomes very cumbersome and time-consuming. This is especially true when using mechanical disassembly and connection devices since the rod sections have a size and weight which no longer can be handled manually when using powerful linear pulling devices. In addition, care is required to maintain the threaded components of the threaded connection clean enough because dirty threaded connections wear off quickly and there is a risk that the dirty threaded connection becomes jammed and may no longer be detachable. Maintaining the threaded components clean is however labor-intensive and time-consuming at construction sites.

To address these problems, U.S. Pat. No. 5,980,157 proposes a connection of individual rod sections via a plug connection, whereby one end of each rod section is provided with a hook-shaped connection part which cooperates with a ladder-like projection on the other end of each rod section to thereby enable a transmission of pulling forces. The contact surfaces of the connection parts of both rod sections to transmit the pulling and compressive forces are hereby configured planar. While this configuration results in a uniform distribution of the force across the entire contact surface when transmitting pure pulling or compressive forces, a simultaneous presence of a bending moment causes an adverse stress distribution in the area of the contact surface so that the service life of the connection parts and thus the rod sections is reduced.

It would therefore be desirable and advantageous to address this problem and to obviate other prior art shortcomings.

SUMMARY OF THE INVENTION

According to one aspect of the present invention, a rod assembly for a device for trenchless rehabilitation of pipelines includes at least two rod sections connectable to one another by a plug connection in a tension-proof manner, at least a first one of the rod sections having an end formed with a lateral opening, and a second one of the rod sections having an end formed with a crosspiece for insertion in the lateral opening of the first rod section, wherein an end face of the lateral opening and an end face of the crosspiece are pressed against one another in response to a tensile load of the rod assembly, with the end face of the lateral opening and the end face of the crosspiece having an arched configuration.

To ensure clarity, it is necessary to establish the definition of several important terms and expressions that will be used throughout this disclosure.

The term "lateral opening" relates to an opening oriented transversely, but not necessarily vertically, in relation to the longitudinal axis of the rod section.

The term "crosspiece" relates to a land area extending transversely, but not necessarily vertically, in relation to the longitudinal axis of the rod section.

The term "arched configuration" relates to a configuration of the contact surfaces which are curved about at least one (random) spatial axis, wherein the curvature may be shaped about this spatial axis, evenly, i.e. with constant radius (toroidal), or unevenly, i.e. with changing radii. Of course, spatially curved and in particular spherically curved contact surfaces are also to be understood as being covered by the term "arched configuration".

The present invention resolves prior art problems by configuring those end faces of the lateral opening and crosspiece, via which the pulling forces are predominantly transmitted, of arched configuration. As a result, the presence of an adverse stress distribution in the material of the connection point of the rod sections through superimposition of the tensile load with a bending moment can be prevented. As such force superimpositions are normally encountered during boring operation, the arched configuration of the contact surfaces according to the present invention results in a prolongation of the service life of the rod assembly.

According to another advantageous feature of the present invention, the arched configuration of the contact surfaces can be defined by a curvature about one or more axes which are substantially vertical when using the rod assembly as intended, i.e. in a horizontal orientation, and thus are perpendicular to the longitudinal axis of the rod sections.

According to another advantageous feature of the present invention, each rod section can be configured in such a way as to have on one of its (length axial) ends a first connection part, e.g. a lateral opening, and on the other one of the ends with the second connection part, e.g. a crosspiece, to realize the plug connection according to the present invention. As a result, any two rod sections of the rod assembly can be connected with one another.

According to another advantageous feature of the present invention, the arched configuration of the end face of the lateral opening and the arched configuration of the end face of the crosspiece can complement one another. In other words, the complementing portions of the end faces have a same curvature. As a result, pulling forces can be evenly transmitted across the entire contact surface.

According to another advantageous feature of the present invention, the crosspiece and the lateral opening can be configured to enable an angular disposition of the at least two rod sections about a defined angle range. Advantageously, the angled disposition can be realized in a plane which is substantially horizontal, when using the rod assembly as intended (in the horizontal) so that the length axis of the rod sections extends in this plane or in parallel relation thereto. As a result, a defined play can be realized in the connection between the individual rod sections of the rod assembly to thereby prevent or at least significantly reduce the presence of a bending moment to act on the plug connection.

According to another advantageous feature of the present invention, the crosspiece has a width and the lateral opening has a width which can be greater than the width of the crosspiece. In this way, the two rod sections can be positioned at a defined angle. In addition, it is also possible to attain the angled disposition through a different configuration of the lateral opening and the crosspiece, for example a lateral opening with a constant width and a crosspiece with slightly tapering width.

According to another advantageous feature of the present invention, the connection part of one of the two rod sections to be connected has a protruding locking member for engagement in a recess in the other one of the two rod sections to prevent a separation of the connected rod sections in the event of a parallel displacement. Advantageously, the rod sections extend at an angle in relation to one another, i.e. non-coaxial relationship, in order to permit a connection or separation of the rod sections. Then, the rod sections are pivoted back into a coaxial disposition in which the crosspiece in concert with the lateral opening is able to support the pulling and compressive loads and the projecting locking member prevents a lateral separation, at least in one direction. Pivoting takes place suitably in a plane which extends transversely and currently preferred perpendicularly to the plane in which the two rod sections can be set at a defined angle.

According to another aspect of the present invention, a device for trenchless rehabilitation of pipelines includes a rod assembly having at least two rod sections, with at least a first one of the rod sections having an end formed with a lateral opening, and a second one of the rod sections having an end formed with a crosspiece for insertion in the opening of the first rod section, and a plug connection to connect the at least two rod sections with one another in a tension-proof manner, wherein an end face of the lateral opening and an end face of the crosspiece are pressed against one another in response to a tensile load of the rod assembly, with the end face of the lateral opening and the end face of the crosspiece having an arched configuration, and a linear drive configured for at least temporary connection to the rod assembly for moving the rod assembly.

When a rod assembly according to the present invention is used for trenchless rehabilitation of pipelines, compressive forces must be transmitted at least to a small degree so as to be able to push the leading end of the rod assembly at the start of the rehabilitation process from the pit, in which the linear drive is arranged, to the opposite end of the pipeline section being rehabilitated and to connect the pipeline section with the new pipe there. Those end faces of the lateral opening and the crosspiece to transmit the compressive forces are also configured in the shape of an arch.

The plug connection may also be provided in accordance with the present invention with locking elements which prevent a buckling of the rod assembly, when the rod assembly is exposed to a compressive load and thus to prevent the individual rod sections of the rod assembly to inadvertently angle to one another and thereby possibly cause a separation thereof. For that purpose, the connection part of one of the two rod sections to be interconnected may be provided with a projecting locking member for engagement in a recess of the other rod section to thereby prevent an angling of the two rod sections in the event of a compressive load.

The temporary connection of the linear drive with the rod assembly may be realized in a force-locking manner. Currently preferred is however a connection of the linear drive to the rod assembly by way of a formfitting engagement. In this way, inadvertent slippage as a result of great forces, oftentimes generated during trenchless rehabilitation of pipelines, in combination with a contamination of the rod assembly can be prevented. The formfitting engagement of the linear drive to the rod assembly may be realized, for example, through engagement in recesses or projections at least in some areas, in or on the rod sections at uniform distances.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
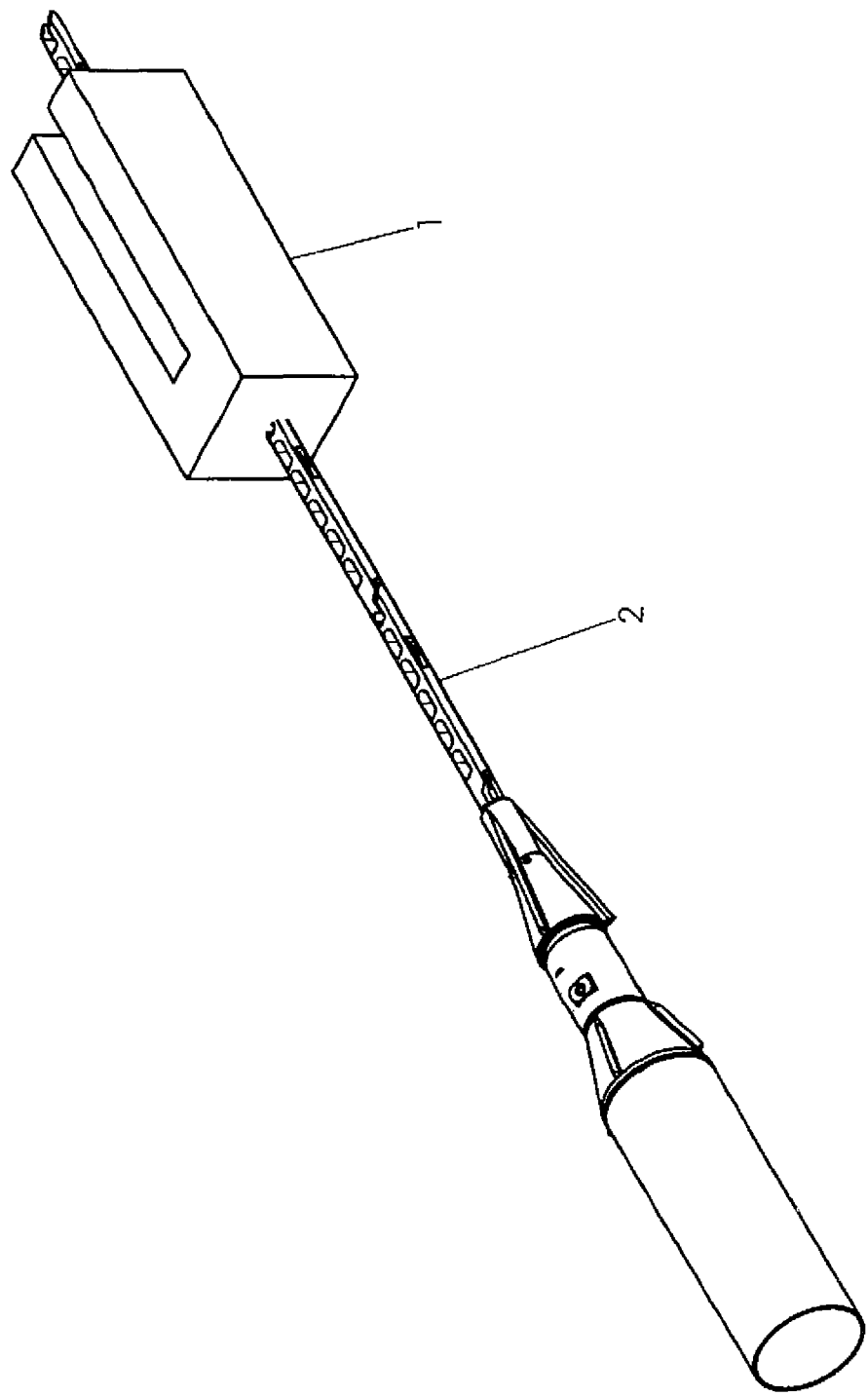
FIG. 1 is a schematic illustration of a device for rehabilitating pipelines in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a device for rehabilitating pipelines in accordance with the present invention. The device includes a pulling device 1, for example in the form of a hydraulic linear pulling device, for pulling a rod assembly 2 which has one end connected to an upsizing head at a distance to the pulling device 1. The upsizing head may be connected via an adapter with a new pipe which can be drawn in while the old pipe is shattered.

Figure 2:
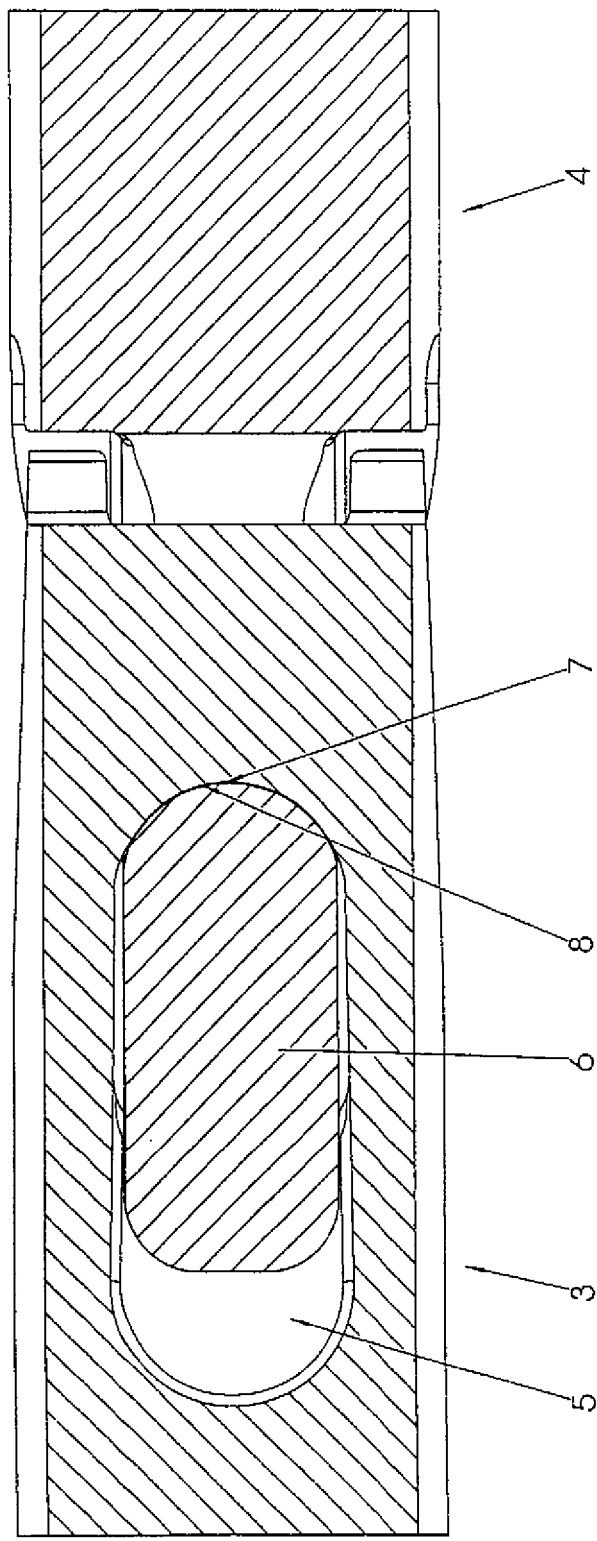
FIG. 2 is a sectional top view of a plug connection for interconnecting individual rod sections of a rod assembly for the device of FIG. 1.

FIG. 2 shows a detailed view of confronting ends of two rod sections 3, 4 of the rod assembly 2 for connection with one another by a plug coupling or plug connection. The left-hand one of the two rod sections 3, 4, shown in FIG. 2 at least in part, has one end provided with a lateral opening 5, whereas the right-hand one of the rod sections 3, 4 is provided with a crosspiece 6 for insertion in the lateral opening 5. The lateral opening 5 has an arched end face 7 which is curved about an axis oriented perpendicular to the drawing plane. The lateral opening 5 acts as a "socket" of the plug connection and has a trailing region, e.g. the region which is acted upon by the crosspiece 6 in response to a tensile load of the rod assembly 2, which region has an arched, in particular spherical, shoulder.

The crosspiece 6 represents a "plug" of the plug connection and has an end face 8 which has also an arched configuration curved about an axis extending perpendicular to the drawing plane. The end face 8 can be pressed against the end face 7 in response to a tensile load of the rod assembly 2. The end face 7 of the lateral opening 5 and the end face 8 of the crosspiece 6 have matching arched configuration, i.e. the contacting end faces 7, 8 have a same curvature.

As a result of the arched configuration of the end faces 7, 8, the end face 8 of the crosspiece 6 is in full contact against the end face 7 of the lateral opening 5 at all times, even when pulling at a slant, i.e. the crosspiece 6 and the lateral opening 5 extend at an angle of up to several degrees. Even when, for example, encountering a 2° angular disposition, the crosspiece 6 will not touch on its projection side a side flank of the lateral opening 5 so that no bending moments are exerted on the projection of the crosspiece 6 which operates as plug, and the crosspiece 6 is prevented from detachment.

In order to permit a defined angular disposition of the lateral opening 5 and the crosspiece 6 that jointly form the plug connection, the lateral opening 5 has a width which is greater than the width of the crosspiece 6. The width of the lateral opening 5 increases in longitudinal direction of the rod section 4. The end face 7 of the lateral opening 5 embraces the end face 8 of the crosspiece 6 over a greater angular range. The angular range of the end face 8 of the crosspiece 6 is smaller than the angular range of the end face 7 of the lateral opening 5. The end face 8 of the crosspiece 6 straightens in relation to the contact surface between the two end faces 7, 8 earlier, in particular changes to a straight line that is substantially perpendicular to the longitudinal axis. In the exemplified embodiment of FIG. 2, the crosspiece 6 has a constant width.

Figure 3:
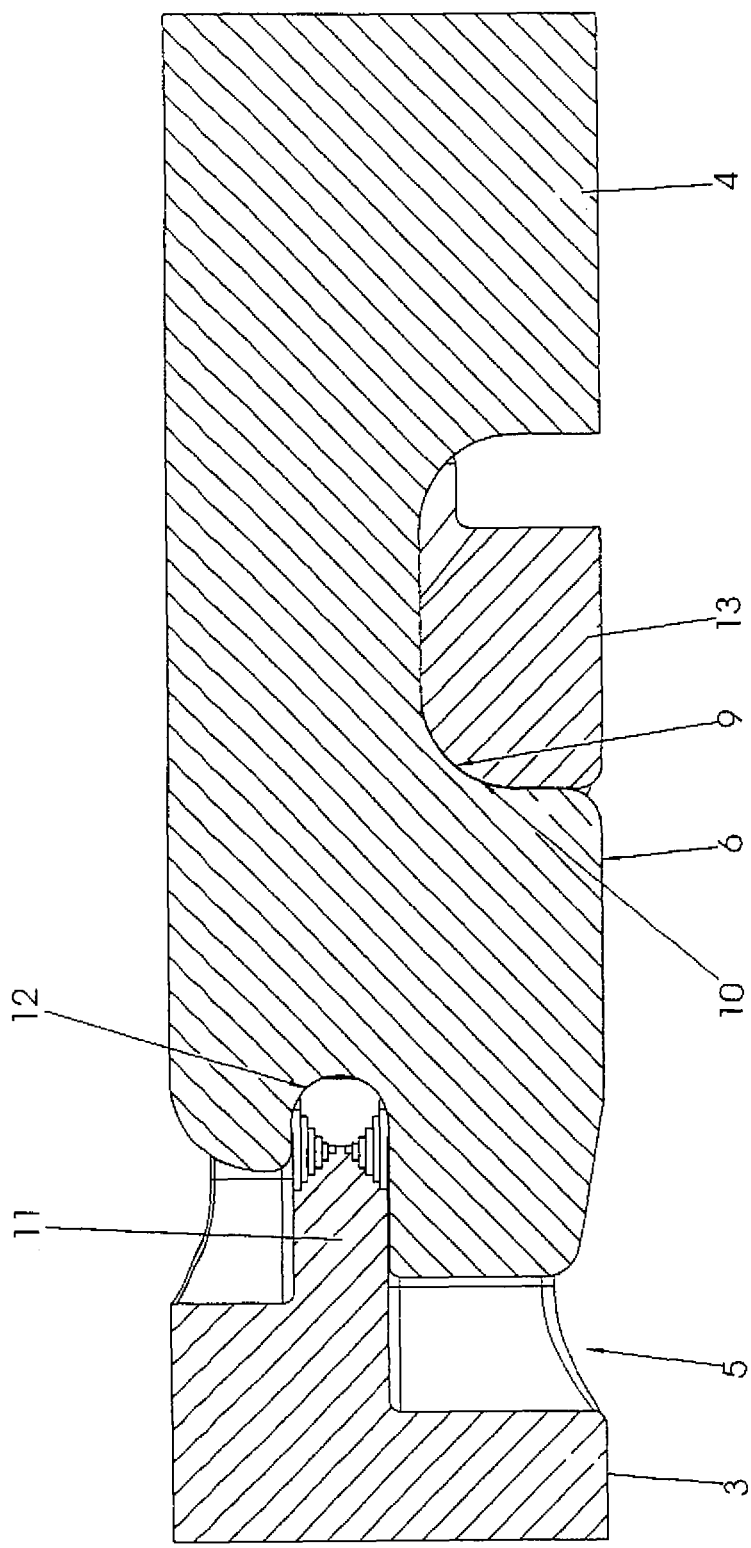
FIG. 3 is longitudinal section of the plug connection of FIG. 2.

As can be seen from FIG. 3, the lateral opening 5 and the crosspiece 6 are further formed at the end faces 7, 8 with arched contact surfaces 9, 10 which are curved about an axis extending perpendicular to the drawing plane. The arched configuration of the contact surfaces 9, 10 is thus established about several axes which are oriented perpendicular to the longitudinal axis of the rod sections 3, 4. The end faces 7, 8 and the contact surfaces 9, 10 are sub-areas of an entire area which forms a contact area of the respective element, i.e. lateral opening 5 or crosspiece 6, for the respectively other element of the plug connection.

The rod section 3 is provided with a projecting locking member 11 which, when assembled, engages a recess 12 in the rod section 4, as shown in FIG. 3. To connect both rod sections 3, 4, the rod section 4 has to be set at an angle to the rod section 2 so as to be able to guide the crosspiece 6 through the locking member 11 and the portion 13, shown in FIG. 3. Thereafter, the rod sections 3, 4 are locked in place with one another by pivoting the rod section 4 into a coaxial position with respect to the rod section 3. Pivoting is realized in a plane which is transversely to the plane in which the two rod sections 3, 4 can be angled to one another.

A possible angling between the two rod sections 3, 4 is also being considered by dimensioning the end formed with the lateral opening 5 with a smaller width in relation to the longitudinal direction transversely to the lateral opening 5 of the rod sections 3, 4 than the width in the region of the lateral opening 5. The decrease in the width at the end of the rod sections 3, 4 in the region of the lateral opening 5 is suited to the angling that is possible during use of the rod assembly 2 by preventing the end of the rod section 3, 4 from increasing the cross section of the rod assembly 2 in the region of the plug connection even when set at an angle.

FIG. 3 shows the ability to transmit compressive forces from one of the rod sections 3, 4 to the other one of the rod sections 3, 4 via the locking member 11 of the rod section 3 and the recess 12 of the rod section 4 as the locking member 11 and the recess 12 come into contact with one another when one of the two rod sections 3, 4 is exposed to a compressive load in longitudinal direction of the rod assembly 2. For that purpose, the contacting surfaces of recess 12 and locking member 11 have at least in part an arched configuration.

Figure 4:
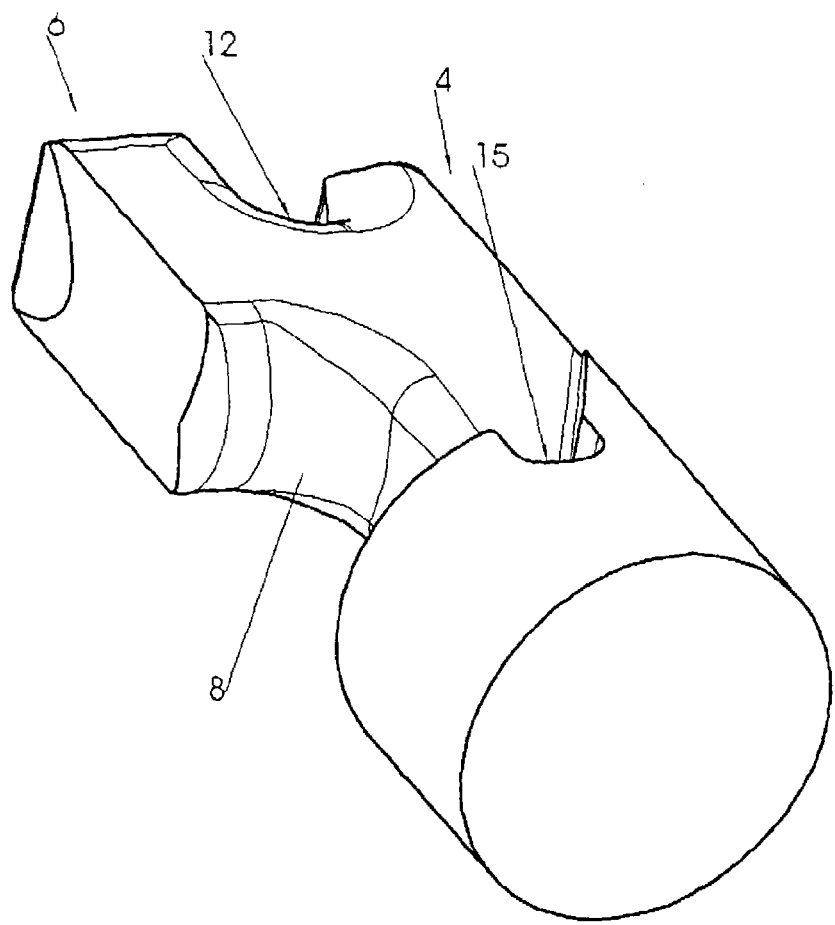
FIG. 4 is an isometric illustration of a first one of two connection parts of the plug connection of FIGS. 2 and 3.
Figure 5:
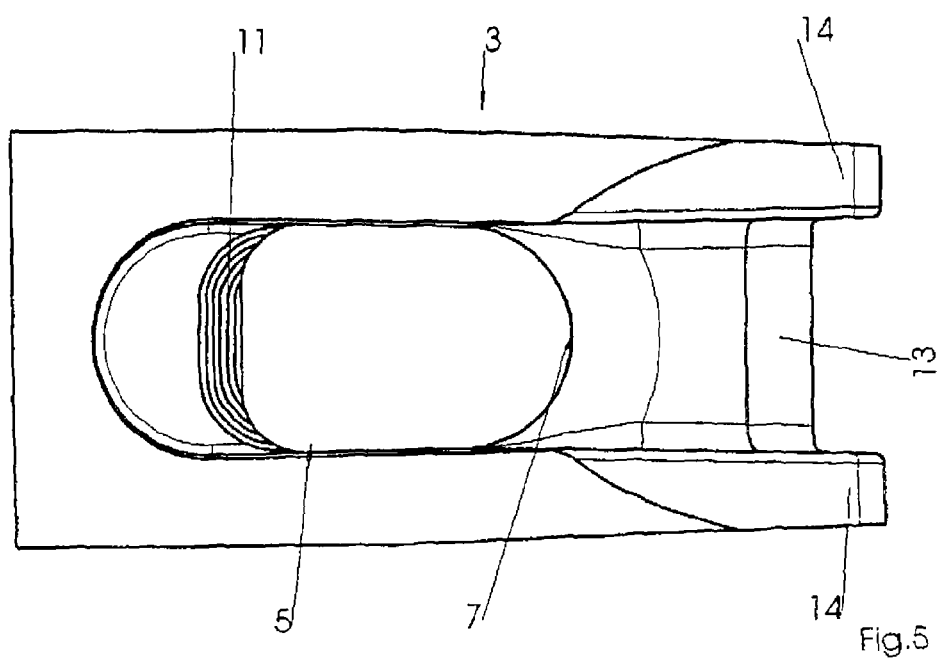
FIG. 5 is a top view of a second one of the two connection parts of the plug connection of FIGS. 2 and 3.

FIG. 4 shows the end of the rod section 4 by way of an isometric illustration and FIG. 5 shows the end of the rod section 3 by way of a top view.

Figure 6:
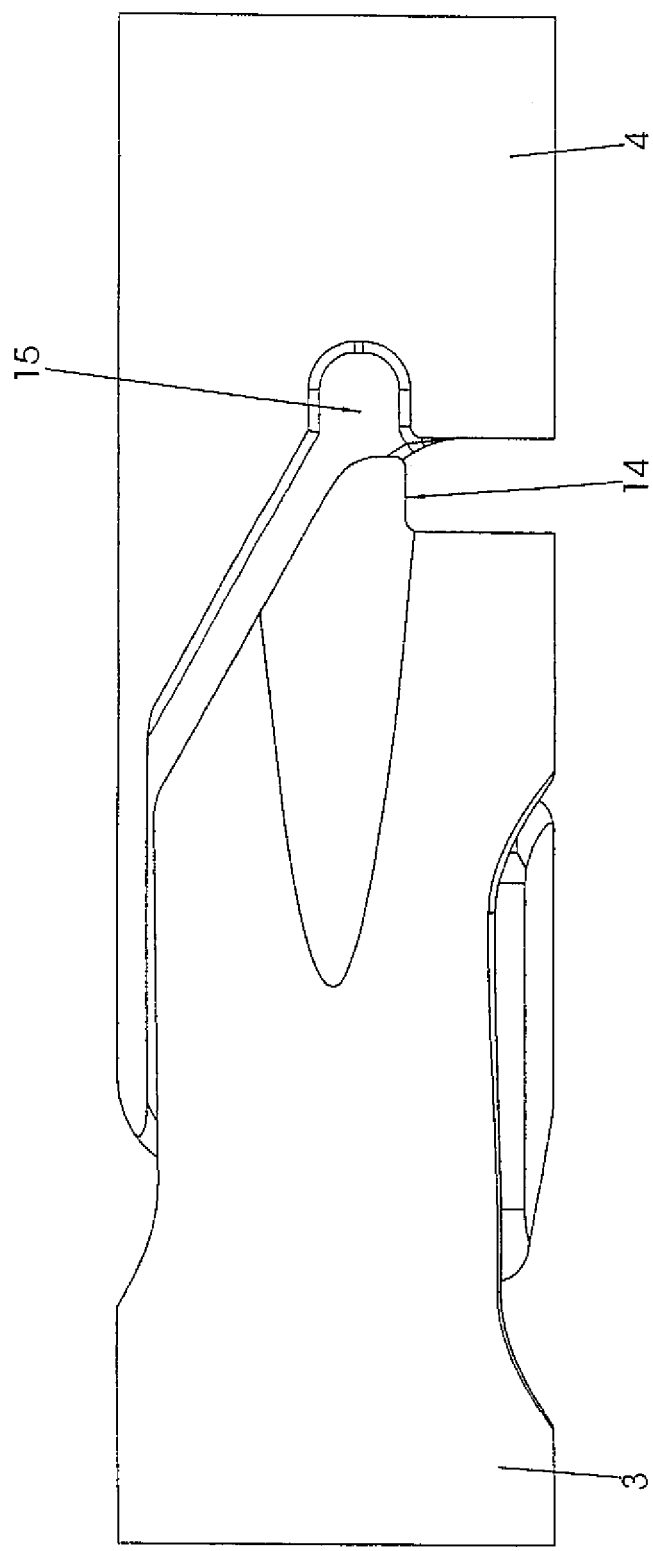
FIG. 6 is a side view of the plug connection of FIG. 2.

FIG. 6 shows a side view of the plug connection, with the rod sections 3, 4 provided with locking elements in the form of projecting securing member 14 and recess 15. These locking elements are also shown in FIGS. 4 and 5. The rod section 3 has two securing members 14 at the end provided with the lateral opening 5. The securing members 14 are rounded and arranged offset by about 90° about the longitudinal direction of the rod section 3 in relation to the lateral opening 5. The rod section 4 has recesses 15 in the region of the crosspiece 6. The recesses 15 are rounded and each recess 15 is arranged at the rod section 4 offset by 90° in relation to the crosspiece 6. The shapes of the securing member 14 and the recess 15 complement one another. The securing member 14 is able to engage the recess 15 with slight play. When the rod assembly 2 is exposed to a compressive force, the securing members 14 engage the recesses 15 to prevent an angling of the rod assembly 2.

It will be appreciated by persons skilled in the art that the depicted exemplary embodiment shows only one end of the rod sections 3, 4 with provided element of the plug connection, when in fact both ends of each rod section is provided with elements of the plug connection, whereby the elements on both ends of each of the rod sections 3, 4 differ from one another, i.e. one end is provided with a lateral opening 5 and the other end is provided with a crosspiece 6.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rod assembly for a device for trenchless rehabilitation of pipelines, said rod assembly comprising at least two rod sections, each of the rod sections having a longitudinal axis, connectable to one another by a plug connection in a tension-proof manner, at least a first one of the rod sections having an end formed with a lateral opening, and a second one of the rod sections having an end formed with a crosspiece for insertion in the lateral opening of the first rod section, wherein an end face of the lateral opening and an end face of the crosspiece are pressed against one another in response to a tensile load of the rod assembly, said end face of the lateral opening and said end face of the crosspiece each having an arched configuration curved about two non-parallel axes, both of the two axes being substantially perpendicular to the longitudinal axis of at least one of the rod sections.

2. The rod assembly of claim 1, wherein each rod section has axial ends and is configured to have on one axial end one member selected from the group consisting of the lateral opening and the crosspiece, and on another axial end the other member of the group.

3. The rod assembly of claim 1, wherein the arched configuration of the end face of the lateral opening and the arched configuration of the end face of the crosspiece complement one another.

4. The rod assembly of claim 1, wherein the crosspiece and the lateral opening are configured to allow an angling of the at least two rod sections about a defined angle range.

5. The rod assembly of claim 1, wherein the crosspiece has a width and the lateral opening has a width which is greater than the width of the crosspiece.

6. The rod assembly of claim 1, wherein the crosspiece has a protruding locking member to prevent a separation of the connected rod sections in the event of a parallel displacement.

7. The rod assembly of claim 1, wherein the crosspiece and the lateral opening are configured to extend at an angle in relation to one another when connecting or separating the rod sections.

8. The rod assembly of claim 1, wherein one of the two rod sections has at least one projection for engagement in a recess of the other one of the two rod sections when subjecting the rod assembly to a compressive load.

9. A device for trenchless rehabilitation of pipelines, said device comprising:
   a rod assembly including at least two rod sections, each of the rod sections having a longitudinal axis, connectable to one another by a plug connection in a tension-proof manner, at least a first one of the rod sections having an end formed with a lateral opening, and a second one of the rod sections having an end formed with a crosspiece for insertion in the lateral opening of the first rod section; wherein an end face of the lateral opening and an end face of the crosspiece are pressed against one another in response to a tensile load of the rod assembly, said end face of the lateral opening and said end face of the crosspiece each having an arched configuration curved about two non-parallel axes, both of the two axes being substantially perpendicular to the longitudinal axis of at least one of the rod sections; and
   a linear drive configured for at least temporary connection to the rod assembly for moving the rod assembly.

10. The device of claim 9, wherein each rod section has axial ends and is configured to have on one axial end one member selected from the group consisting of lateral opening and crosspiece, and on another axial end the other member of the group.

11. The device of claim 9, wherein the arched configuration of the end face of the lateral opening and the arched configuration of the end face of the crosspiece complement one another.

12. The device of claim 9, wherein the crosspiece and the lateral opening are configured to enable an angling of the at least two rod sections about a defined angle range.

13. The device of claim 9, wherein the crosspiece has a width and the lateral opening has a width which is greater than the width of the crosspiece.

14. The device of claim 9, wherein the crosspiece has a protruding locking member to prevent a separation of the connected rod sections in the event of a parallel displacement.

15. The device of claim 9, wherein the crosspiece and the lateral opening are configured to extend at an angle in relation to one another when connecting or separating the rod sections.

16. The device of claim 9, wherein one of the two rod sections has at least one projection for engagement in a recess of the other one of the two rod sections when subjecting the rod assembly to a compressive load.

17. The device of claim 9, wherein the linear drive is configured for formfitting engagement upon the rod assembly.

18. The device of claim 17, wherein the linear drive is configured for engagement in recesses or projections provided, at least in some areas, in or on the rod sections at uniform distances.

19. The rod assembly of claim 1, wherein the arched configurations of the end face of the lateral opening and the end face of the crosspiece each comprise a varying radius of curvature.

20. The rod assembly of claim 1, wherein the arched configurations of the end face of the lateral opening and the end face of the crosspiece each comprise a constant radius of curvature.

21. The rod assembly of claim 1, wherein the two non-parallel axes comprise two perpendicular axes.

* * * * *